(12) United States Patent
Matsuta

(10) Patent No.: US 10,571,985 B2
(45) Date of Patent: Feb. 25, 2020

(54) LIMITING POWER CONSUMPTION IN AN ELECTRONIC DEVICE

(71) Applicant: YAMAHA CORPORATION, Hamamatsu-shi (JP)

(72) Inventor: Naohiro Matsuta, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 188 days.

(21) Appl. No.: 15/934,254

(22) Filed: Mar. 23, 2018

(65) Prior Publication Data

US 2018/0210529 A1 Jul. 26, 2018

Related U.S. Application Data

(63) Continuation of application No. PCT/JP2016/078699, filed on Sep. 28, 2016.

(30) Foreign Application Priority Data

Sep. 28, 2015 (JP) ................................. 2015-190506

(51) Int. Cl.
G06F 1/26 (2006.01)
H02J 7/00 (2006.01)
H02J 7/34 (2006.01)

(52) U.S. Cl.
CPC .............. *G06F 1/266* (2013.01); *G06F 1/26* (2013.01); *H02J 7/007* (2013.01); *H02J 7/34* (2013.01); *H02J 2007/0062* (2013.01)

(58) Field of Classification Search
CPC .. G06F 1/266; G06F 1/26; H02J 7/007; H02J 7/34; H02J 2007/0062; H02J 7/0042

(Continued)

(56) References Cited

U.S. PATENT DOCUMENTS

2003/0088798 A1 5/2003 Ono et al.
2005/0141208 A1 6/2005 Niinuma
(Continued)

FOREIGN PATENT DOCUMENTS

EP 1445780 A1 8/2004
JP 2000029544 A 1/2000
(Continued)

OTHER PUBLICATIONS

English translation of Written Opinion issued in Intl. Appln. No. PCT/JP2016/078699 dated Dec. 6, 2016, previously cited in IDS filed Mar. 23, 2018.

(Continued)

*Primary Examiner* — Richard Isla
*Assistant Examiner* — Mohammed J Sharief
(74) *Attorney, Agent, or Firm* — Rossi, Kimms & McDowell LLP

(57) ABSTRACT

An electronic device includes: first and second processing circuits; a current limiting circuit configured to limit the electric current supplied to the first processing circuit; and a power storage unit inserted between the current limiting circuit and the first processing circuit to be in parallel to the first processing circuit. The first processing circuit is supplemented with electric charge stored in the power storage unit in a case where an electric current exceeding a current limit value of the current limiting circuit is consumed. In response to the connection to an external power supply, a limit of inflow of the electric current to the first and second processing circuits is made and a charging mode is started, and then the limit is released and it is switched to an operating mode.

20 Claims, 4 Drawing Sheets

(58) Field of Classification Search
USPC .......................................................... 320/107
See application file for complete search history.

(56) References Cited

U.S. PATENT DOCUMENTS

| | | | |
|---|---|---|---|
| 2009/0110214 A1 | 4/2009 | Litovsky et al. | |
| 2010/0246857 A1* | 9/2010 | Kajita | H03G 3/007 381/120 |
| 2011/0162043 A1* | 6/2011 | Sakai | G06F 1/26 726/3 |
| 2013/0162198 A1 | 6/2013 | Yokota et al. | |
| 2016/0301228 A1* | 10/2016 | Hong | H02J 7/0031 |

FOREIGN PATENT DOCUMENTS

| | | |
|---|---|---|
| JP | 2001202144 A | 7/2001 |
| JP | 2004086647 A | 3/2004 |
| JP | 2005141732 A | 6/2005 |
| JP | 2005173937 A | 6/2005 |
| JP | 2007049786 A | 2/2007 |
| JP | 2007156605 A | 6/2007 |
| JP | 2009094684 A | 4/2009 |
| JP | 2013134683 A | 7/2013 |

OTHER PUBLICATIONS

International Preliminary Report on Patentability issed in Intl. Appln. No. PCT/JP2016/078699 dated Apr. 12, 2018. English translation provided.
Office Action issued in Japanese Appln. No. 2015-190506 dated Jul. 9, 2019. English translation provided.
Extended European Search Report issued in European Appln. No. 16851673.0 dated May 14, 2019.
International Search Reprot issued in Intl. Appln. No. PCT/JP2016/078699 dated Dec. 6, 2016. English translation provided.
Written Opinion issued in Intl. Appln. No. PCT/JP2016/078699 dated Dec. 6, 2016.

* cited by examiner

US 10,571,985 B2

LIMITING POWER CONSUMPTION IN AN ELECTRONIC DEVICE

CROSS-REFERENCE TO RELATED APPLICATION

The present disclosure contains subject matter related to that disclosed in Japanese Patent Application JP2015-190506 filed in the Japan Patent Office on Sep. 28, 2015 and International Patent Application PCT/JP2016/078699 filed in the Japan Patent Office on Sep. 28, 2016, the entire contents of which are hereby incorporated by reference.

BACKGROUND OF THE INVENTION

1. Field of the Invention

The present invention relates to an electronic device and a control method for an electronic device.

2. Description of the Related Art

Among electronic devices to be connected to a USB port of a personal computer, there are many so-called "bus power" devices, which operate by electric power supplied from the USB port. However, the electric power supplied from the USB port is at most 5 V/500 mA, that is, 2.5 W, and has been insufficient for devices that require large power, for example, audio power amplifiers.

To address the above-mentioned problem, in the related art, there have been proposed a device configured to be connected to an AC adapter or another such self-power supply in addition to bus power to use the self-power supply depending on required power, or a device configured to receive electric power supplied from two USB cables (JP 2005-141732 A, for example).

SUMMARY OF THE INVENTION

However, connecting the AC adapter in addition to the USB, or connecting the two USB cables is troublesome to a user, and separately providing a connector or a power supply circuit for that purpose has been disadvantageous in terms of size for a USB device, which is desired to be downsized. Separately providing the connector or the power supply circuit has also been disadvantageous in terms of cost.

Meanwhile, it can be contemplated that parameters of the circuit are set so that the circuit normally operates at 2.5 W, which is the upper limit of the bus power, to thereby perform operation that is functionally satisfactory within the range of the bus power. However, an audio amplifier configured to amplify an audio signal, which has a significant level variation and a sudden peak, for example, human voice, may be short in required current during the amplification, with the result that a power supply voltage at an amplifier unit drops to cause sound cracking and other such problems.

In view of the above, it is an object of the present invention to provide an electronic device and a control method for an electronic device, regarding an electronic device which is configured to operate on limited electric power, for example, USB bus power or the like, capable of supporting short-time peak power consumption and starting quickly when being powered on.

An electronic device according to an aspect of the present invention includes: a power supply connection unit that is connected to an external power supply; a control unit, a first processing circuit, and a second processing circuit, each of which is configured to operate by receiving an electric current supplied from the power supply connection unit; a current limiting circuit that is configured to limit the electric current supplied from the external power supply to the first processing circuit; and a power storage unit that is inserted between the current limiting circuit and the first processing circuit to be in parallel to the first processing circuit. In the electronic device, the first processing circuit is supplemented with electric charge stored in the power storage unit in a case where an electric current exceeding a current limit value of the current limiting circuit is consumed. Moreover, in the electronic device, the control unit is configured to, in response to the connection of the power supply connection unit to the external power supply, limit inflow of the electric current to the first processing circuit and the second processing circuit and start a charging mode in which the current limit value is set to a second value that is higher than a first value, and to then release the limit on the inflow of the electric current to the first processing circuit and the second processing circuit and switch to an operating mode in which the current limit value is set to the first value.

A control method according to an aspect of the present invention is a control method for electronic device including a first processing circuit and a second processing circuit that each operates by an electric current supplied from an external power supply. The control method includes: charging a power storage unit that is inserted between a current limiting circuit and the first processing circuit to be in parallel to the first processing circuit, the current limiting circuit being configured to limit the electric current supplied from the external power supply to the first processing circuit; supplementing the first processing circuit with the electric charge stored in the power storage unit in a case where an electric current exceeding a current limit value of the current limiting circuit is consumed; limiting, in response to the connection to the external power supply, inflow of the electric current to the first processing circuit and the second processing circuit, and starting a charging mode in which the current limit value is set to a second value that is higher than a first value; and releasing the limit on the inflow of the electric current to the first processing circuit and the second processing circuit, and switching to an operating mode in which the current limit value is set to the first value.

DETAILED DESCRIPTION OF THE INVENTION

Figure 1:
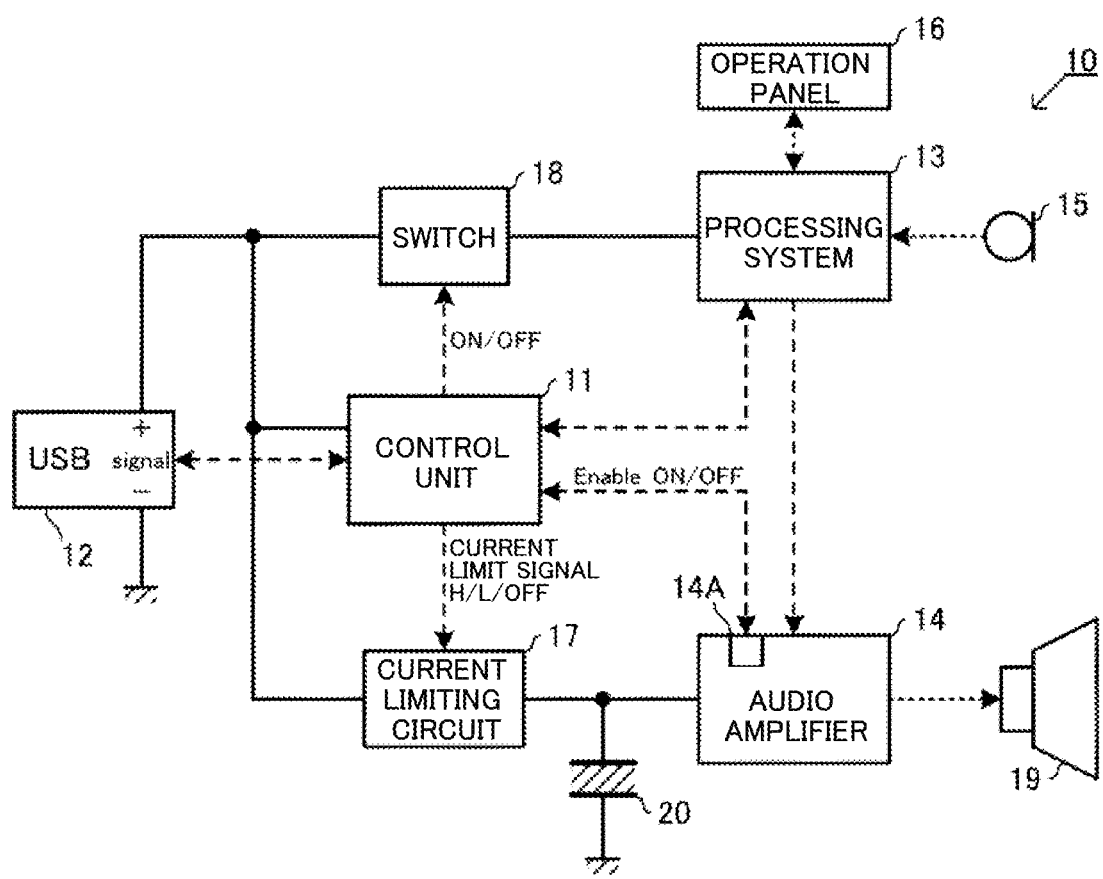
FIG. 1 is a block diagram of an audio conference device in an embodiment of the present invention.
Figure 2:
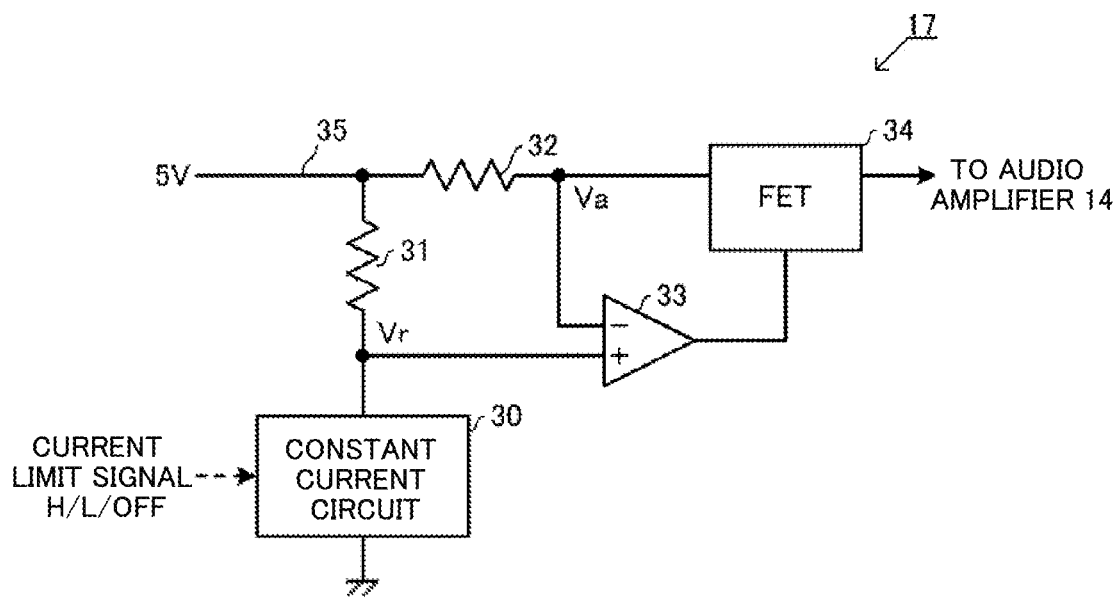
FIG. 2 is a block diagram of a current limiting circuit of the audio conference device.
Figure 3:
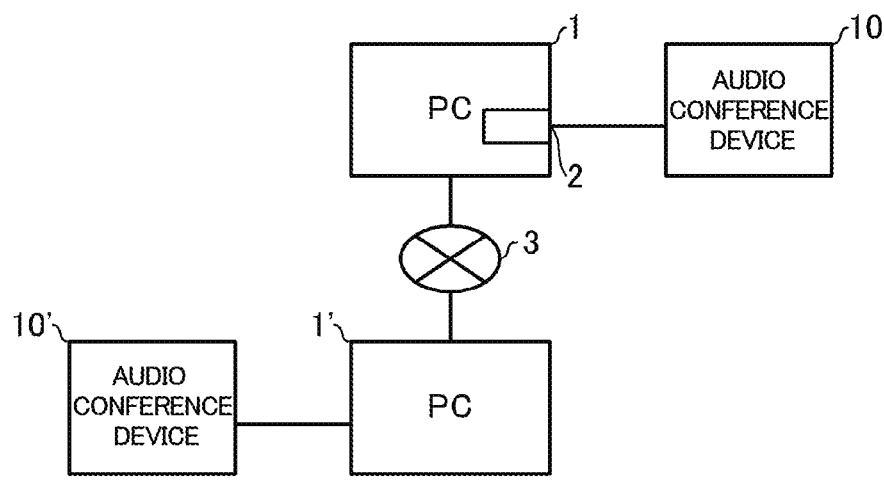
FIG. 3 is a diagram for illustrating a form of use of the audio conference device.

FIG. 1 is a block diagram of an audio conference device 10 in an embodiment of the present invention. FIG. 2 is a block diagram of a current limiting circuit 17. FIG. 3 is a diagram for illustrating a form of use of the audio conference device 10. As illustrated in FIG. 3, the audio conference device 10 is connected to a USB port 2 of a personal computer (PC) 1, and is used for a remote audio conference via a network 3, for example, the Internet or the like. The audio conference device 10 includes a microphone 15 and a speaker 19 to pick up a voice of a user (conference attendee) and emit a voice of a user at the other end. The personal computer 1 is connected to a personal computer 1' and an audio conference device 10' at the other end via the network (Internet) 3 to mutually transmit and receive audio signals of the conference. The audio conference device 10 is configured to operate on a power supply (bus power: generally 5 V, Max 500 mA) supplied from the USB port 2 of the personal computer 1.

In FIG. 1, the solid line indicates a power supply line, and the broken line with arrows indicates a signal line. The signal line includes an audio signal line and a control signal line. From a USB interface 12, +/− power supplies and a signal are extracted. The signal line is connected to a control unit 11. The power supply line is connected to the control unit 11 and to a processing system 13 via a switch (analog switch) 18, and is connected to an audio amplifier 14 and a capacitor 20 via the current limiting circuit 17.

The control unit 11 is realized by a microcomputer, and is configured to control the entire operation of the audio conference device 10. An audio packet containing an audio signal at the other end as the payload is input to the control unit 11 via the USB interface 12. The control unit 11 extracts the audio signal from the audio packet, and inputs the extracted audio signal to the processing system 13. Moreover, the processing system 13 inputs a sound pickup signal from the microphone 15 to the control unit 11, and the control unit 11 transmits the sound pickup signal in an audio packet from the USB interface 12 to the device at the other end.

The processing system 13 includes an analog circuit and a digital circuit (DSP), which are configured to process the audio signal, a user interface circuit configured to process display and operation, and various other circuits. The microphone 15 and an operation panel 16 are connected to the processing system 13. The processing system 13 performs equalization, echo canceling, audio adjustment, and other such processing on the audio signal picked up by the microphone 15, and outputs the processed audio signal to the control unit 11. Moreover, the processing system 13 performs equalization, volume adjustment (including AGC), and other such processing on the audio signal at the other end input from the control unit 11, and inputs the processed audio signal to the audio amplifier 14. The audio amplifier 14 includes a power amplifier to amplify power of the input audio signal and emit sound of the audio signal from the speaker 19. Moreover, the processing system 13 detects an operation on the operation panel 16 to notify the control unit 11 of the detected operation, and display a volume level and other such operation information, which are received from the control unit 11, on an indicator of the operation panel 16.

Electric power of 5 V/500 mA is supplied from the USB port 2 of the personal computer 1 to the USB interface 12, but the control unit 11, which is the microcomputer, substantially normally consumes an electric current of about 100 mA (electric power of 500 mW). Moreover, the processing system 13 substantially normally consumes an electric current of about 250 mA (electric power of 1.25 W). Even when a waveform of the audio signal varies, a variation in power consumption is small because the processing system 13 mostly performs digital processing by the DSP.

Meanwhile, the audio amplifier 14 includes an analog amplifier in the last stage, and has a large variation in power consumption depending on an amplitude (volume) of the input audio signal. When the control unit 11 and the processing system 13 are operated on the USB power supply of 500 mA as described above, the remaining current is 150 mA (the remaining power is 750 mW). Therefore, the current limiting circuit 17 is provided between the audio amplifier 14 and the USB interface 12, which is the source of power supply, to limit an electric current to flow through the audio amplifier 14 during a normal operation to 150 mA or less.

However, when a gain (volume) is set such that a peak of the varying audio signal falls below 750 mW, a volume of an audio of about a normal level is small, and intelligibility is reduced. Therefore, in the audio conference device 10, the capacitor 20 having a large capacity is provided between the current limiting circuit 17 and the audio amplifier 14 to supplement the peak power with electric charge stored in the capacitor 20. The capacitor 20 is an electric double layer capacitor called "supercapacitor", for example, and has a capacity of about 0.5 farads (F), for example.

After the audio conference device 10 is powered on (USB is connected), it is preferred that the audio conference device 10 fully charge the capacitor 20 before starting operation. However, when the capacitor 20 having the large capacity is charged with the electric current of 5 V/150 mA or less so as to prevent a voltage drop due to an inrush current, time of about 1 minute is required. Therefore, in the audio conference device 10, immediately after the audio conference device 10 is powered on, the electric current is not supplied to the processing system 13 and the audio amplifier 14, and an electric current (about 400 mA) other than the electric current supplied to the control unit 11 is used to charge the capacitor 20 to shorten the time until the start of the operation.

In order to realize the operation, the switch 18 configured to turn on/off the power supply is provided between the USB interface 12, which is the source of power supply, and the processing system 13. Moreover, a switch 14A is also provided inside the audio amplifier 14. The switches 18 and 14A are set to off to set a limit value of the current limiting circuit 17 to 400 mA (limit value H) until predetermined time has elapsed after the power is turned on. At this time, the current limit value of the current limiting circuit 17 is not suddenly set from 0 A to 400 mA, but the current limit value is gradually increased to 400 mA (for example, over a time period of about 0.6 seconds). As a result, the inrush current to the capacitor 20 can be avoided, and occurrence of a failure in the circuit can be prevented. Through the above-mentioned operation, the capacitor 20 can be charged with the electric current of 400 mA at the maximum in the predetermined time from when the power is turned on, and even when the capacitor 20 is charged so as to prevent the voltage drop due to the inrush current, the charging can be complete within about several seconds to about 10 seconds. Of the USB power supply of 500 mA, 100 mA is used for the operation of the control unit 11. The switch 14A of the audio amplifier 14 is not limited to a switch configured to physically interrupt the electric current, but any operation switching function that is capable of limiting power (current) consumption of the audio amplifier 14 to 0 may be used.

After the time required for charging has elapsed, the control unit 11 turns on the switches 18 and 14A, and changes the limit value of the current limiting circuit 17 to 150 mA (limit value L). As a result, the operation of the audio conference device 10 is started. As described above, during the normal operation, the control unit 11 normally consumes the electric current of about 100 mA, and the processing system 13 normally consumes the electric current of about 250 mA. Therefore, the electric current supplied from the USB interface 12 to the audio amplifier 14 is limited to 150 mA irrespective of the input audio signal. When a high-level peak of an audio signal is input, and the audio amplifier 14 requires the electric current of 150 mA or more, the electric charge is extracted from the capacitor 20 to supplement the shortage. As a result, the sound can be emitted without being distorted even with a temporarily high peak of the audio signal.

When an audio signal of a normal level is input, the audio amplifier 14 can amplify the power of the audio signal with the electric current of 150 mA or less, and an excess current up to 150 mA is used to charge the capacitor 20 that has been discharged during the peak.

FIG. 2 is a block diagram of the current limiting circuit 17. The current limiting circuit 17 is a circuit configured to limit, based on a current control signal input from the control unit 11 to a constant current circuit 30, the electric current to flow through the audio amplifier 14 and the capacitor 20 to 0 mA to 400 mA. The current control signal input to the constant current circuit 30 is a 5-V/10-kHz PWM signal, and is rectified into a direct current having a voltage corresponding to a duty in the constant current circuit 30.

The constant current circuit 30 is a circuit for allowing a constant current having a magnitude that is set with a current setting signal to flow from a power supply line 35 to the ground. A reference resistor 31 is provided between the constant current circuit 30 and the power supply line 35. The reference resistor 31 is a 200-Ω resistor, for example, and when an electric current of 1 mA is allowed to flow by the constant current circuit 30, for example, a potential difference of 0.2 V is generated between terminals. In other words, a voltage Vr on the constant current circuit 30 side of the reference resistor 31 is 4.8V. This voltage value Vr is input as a reference voltage to an operational amplifier 33. The circuit is set such that, when the current control signal (PWM signal) has a duty of 30%, the electric current of 1 mA is allowed to flow through the constant current circuit 30, and the reference voltage Vr is 4.8 V.

A detection resistor 32 is inserted in the power supply line 35. The detection resistor 32 has a small resistance value and a large current capacity. The electric current to be supplied to the audio amplifier 14 and the capacitor 20 flows through the detection resistor 32. The detection resistor 32 has a resistance value of 1 ohm, for example. Therefore, a voltage (voltage drop) between terminals of the detection resistor 32 is 0.2 V when an electric current of 200 mA is allowed to flow through the audio amplifier 14 and the capacitor 20, and a voltage Va at the terminal on the audio amplifier 14 side of the detection resistor 32 is 4.8 V. This voltage value Va is input as a detected voltage to the operational amplifier 33. The operational amplifier 33 compares the detected voltage Va to the reference voltage Vr, and when the detected voltage Va is larger than the reference voltage Vr (when the voltage between the terminals of the resistor 32 is less than the voltage between the terminals of the resistor 31), the operational amplifier 33 operates as a comparator, and turns on an FET 34 to allow the electric current to flow through the audio amplifier 14 and the capacitor 20. However, when the detected voltage Va falls below the reference voltage Vr (when the voltage between the terminals of the resistor 32 exceeds the voltage between the terminals of the resistor 31), the operational amplifier 33 and the FET 34 form a negative feedback circuit, and the FET 34 operates as a resistor to limit the electric current to flow through the audio amplifier 14 and the capacitor 20.

When the duty of the current control signal is set to 60% to allow an electric current of 2 mA to flow through the constant current circuit 30 and hence set the reference voltage Vr to 4.6 V, the current limit value may be set to H (=400 mA). Moreover, when the duty of the current control signal is set to 22.5% to allow an electric current of 0.75 mA to flow through the constant current circuit 30 and hence set the reference voltage Vr to 4.85 V, the current limit value may be set to L (=150 mA). Further, when the duty of the current limit signal is set to 0%, the current limit value may be set to 0 A, that is, the supply of the electric current to the audio amplifier 14 and the capacitor 20 may be stopped. When the current limit value of the current limiting circuit 17 is changed from 0% to 60%, or from 60% to 22.5%, for example, the duty of the current control signal is not changed at once, but is gradually changed (changed by 1% every 10 msec, for example) so that the occurrence of the sudden variation in electric current, for example, the inrush current or the like, and noise can be prevented.

Figure 4:
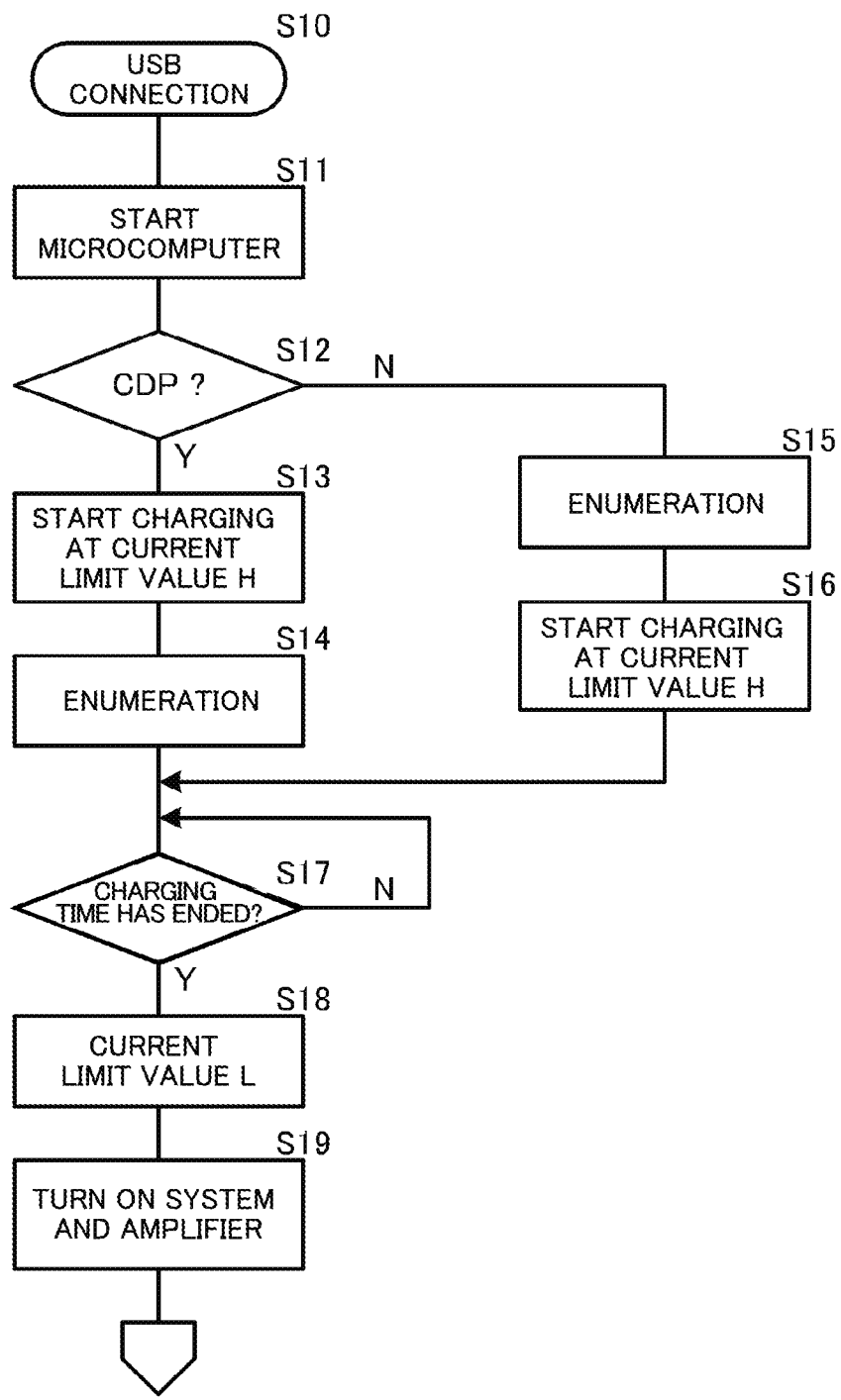
FIG. 4 is a flow chart for illustrating an operation of a control unit of the audio conference device.

Referring to a flow chart of FIG. 4, an operation of the control unit 11 at a time when the power is turned on is described. When the USB interface 12 is connected to the USB port 2 of the personal computer 1 via a cable (Step S10), the operation is started. Immediately after the USB connection is made, the electric power supplied from the USB port 2 is limited to low power (100 mA), and hence the control unit 11 is first started with the electric current (Step S11). Each of the current limiting circuit 17 and the switch 18 is a normally off circuit, which interrupts the electric current without an input of a control signal. The control unit 11 determines whether or not the USB port 2 of the personal computer 1 is a charging downstream port (hereinafter referred to as "CDP") (Step S12). The CDP is a USB port allowing extraction of a high-power (500-mA) current before enumeration.

When the USB port 2 of the personal computer 1 is the CDP (YES in Step S12), the control unit 11 turns on the current limiting circuit 17 at the limit value H (400 mA) to start charging the capacitor 20 (Step S13). At this time, the current limit value of the current limiting circuit 17 is not suddenly set from 0 A to 400 mA, but the current limit value is gradually increased. The switches 18 and 14A are set to off, and the electric current supplied from the USB interface 12 is consumed only by the control unit 11 and the capacitor 20. At the same time, the control unit performs transmission of a descriptor or other such communication to the personal computer 1 to execute the enumeration, in which the personal computer 1 is caused to recognize the audio conference device 10 as a USB audio device (Step S14). This enumeration processing takes time of about several seconds to about 10 seconds.

Meanwhile, when the USB port 2 of the personal computer 1 is not the CDP (NO in Step S12), the control unit 11 first executes the enumeration to complete the USB connection (Step S15), with which the extraction of the electric current of 500 mA from the USB interface 12 is permitted, and then turns on the current limiting circuit 17 at the limit value H (400 mA) to start charging the capacitor 20 (Step S16). Also in this case, the current limit value of the current limiting circuit 17 may be gradually increased.

Moreover, even when the enumeration processing is performed first in Step S15, the current limiting circuit 17 may be operated at a very low current limit value (for example, about 6 mA) that does not affect the operation of the control unit 11 to gradually charge the capacitor 20 during the enumeration processing. As a result, the inrush current at the start of a charging mode can be reduced.

Thereafter, it is determined whether sufficient time for charging (for example, 10 seconds) has elapsed after the charging of the capacitor 20 is started in Step S13 or Step S16 (Step S17). When the time has elapsed, the processing proceeds to Step S18, and when the time has not elapsed, the control unit 11 waits until the time elapses in Step S17.

When the charging time has elapsed (YES in Step S17), the current limit value of the current limiting circuit 17 is changed to L (150 mA) (Step S18), and a status of an Enable signal of each of the switch 18 and the audio amplifier 14 is set to ON to turn on the switch 14A (Step S19). As a result, the audio conference device 10 starts operation of picking up the user's voice and emitting the voice at the other end.

When the current limit value of the current limiting circuit 17 is reduced from H to L, the current limit value may also be gradually reduced (for example, over a time period of about 0.6 seconds). As a result, the occurrence of noise due to the sudden variation in electric current can be prevented.

Figure 5:
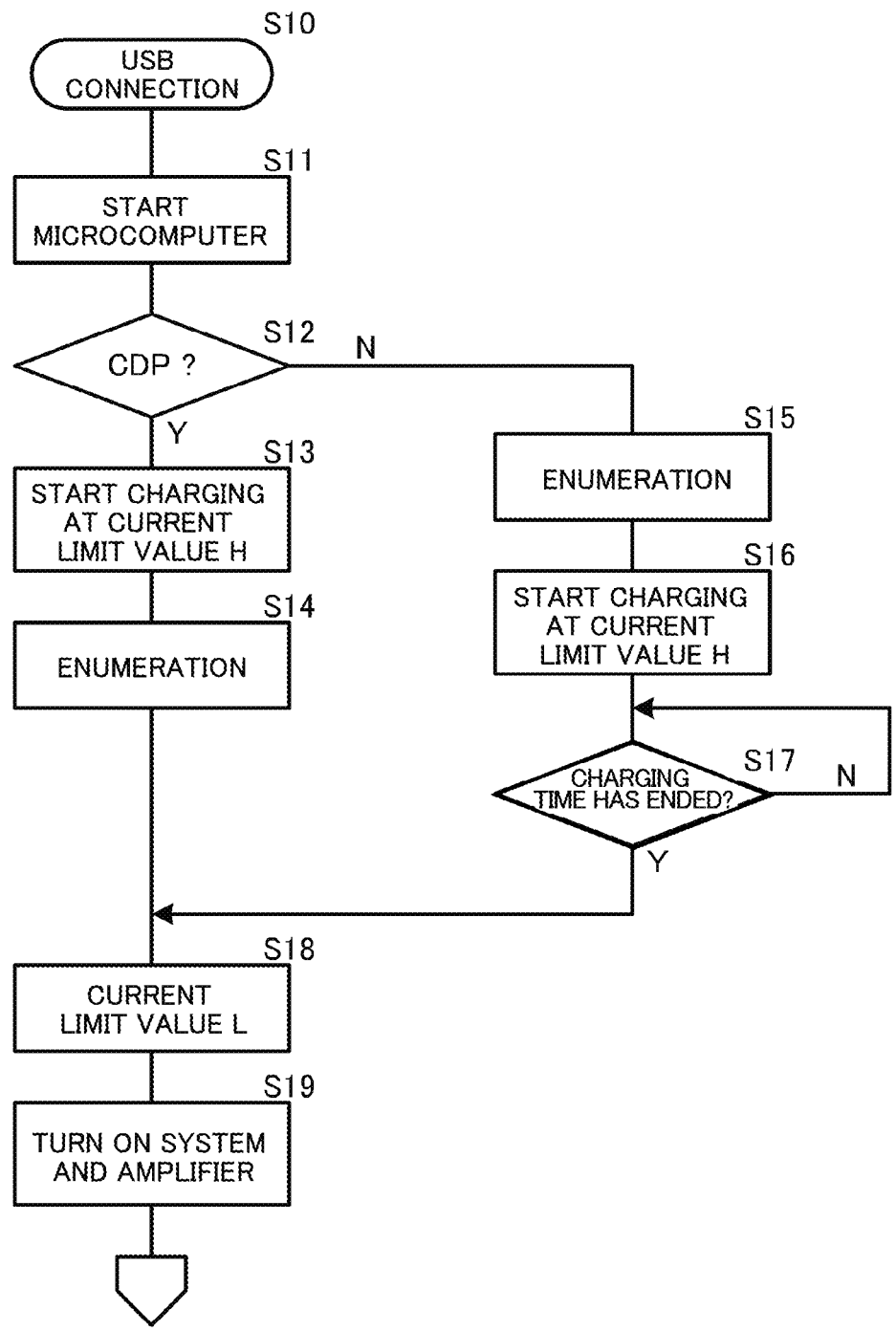
FIG. 5 is a flow chart for illustrating an operation of another embodiment of the control unit of the audio conference device.

In the flow chart of FIG. 4, even when the host USB port 2 is the CDP and the charging of the capacitor 20 is started before the enumeration, the control unit 11 waits until the charging time ends after the enumeration. However, it is considered that the capacitor 20 is charged with a considerable amount of electric current in the time required for the enumeration. Therefore, as illustrated in FIG. 5, only when the host USB port is not the CDP, the control unit 11 waits until the charging time ends in Step S17, and when the host USB port is the CDP, the operation of the audio conference device 10 may be started immediately when the enumeration is complete.

Moreover, in those flow charts, when the USB port 2 of the personal computer 1 as the host is not the CDP, the charging of the capacitor 20 is started after the enumeration, but also in this case, the charging may be started without waiting for the completion of the enumeration.

Moreover, in this embodiment, the end of the charging is determined in Step S17 based on the time from the start of the charging, but a charged capacity of the capacitor 20 (voltage between the terminals) may be monitored, and the end of the charging may be determined based on the monitoring result.

An active discharge circuit is not provided in the capacitor 20. Therefore, even after the power supply is stopped with disconnection of the USB, the capacitor 20 keeps holding the electric charge other than self-discharge. Therefore, when the USB is disconnected once and then connected immediately thereafter, the previous electric charge is held, and hence short time is required for the charging.

In this embodiment, the audio conference device configured to operate on the USB bus power has been described as an example, but the electronic device according to the present invention is not limited to the audio conference device. The present invention is widely applicable to a device with varying current consumption, in particular. For example, the electric device may amplify power of the audio signal input from the microphone 15. Moreover, the supply source of the electric current is not limited to the USB, and the present invention is applicable to any power supply capable of supplying a limited electric current.

[Supplementary Note] As can be understood from the above description of the embodiment, a variety of technical ideas including the invention described below are disclosed in the specification.

An electronic device according to an aspect of the present invention includes: a power supply connection unit that is connected to an external power supply; a control unit, a first processing circuit, and a second processing circuit, each of which is configured to operate by receiving an electric current supplied from the power supply connection unit; a current limiting circuit that is configured to limit the electric current supplied from the external power supply to the first processing circuit; and a power storage unit that is inserted between the current limiting circuit and the first processing circuit to be in parallel to the first processing circuit. The first processing circuit is supplemented with electric charge stored in the power storage unit in a case where an electric current exceeding a current limit value of the current limiting circuit is consumed. The control unit is configured to, in response to the connection of the power supply connection unit to the external power supply, limit inflow of the electric current to the first processing circuit and the second processing circuit and start a charging mode in which the current limit value is set to a second value that is higher than a first value, and to then release the limit on the inflow of the electric current to the first processing circuit and the second processing circuit and switch to an operating mode in which the current limit value is set to the first value.

An electronic device according to another aspect of the present invention includes: a power supply connection unit that is connected to an external power supply; a control unit, a first processing circuit, and a second processing circuit, each of which is configured to operate by receiving an electric current supplied from the power supply connection unit; a current limiting circuit that is configured to limit the electric current supplied to the first processing circuit; a power storage unit that is inserted between the current limiting circuit and the first processing circuit to be in parallel to the first processing circuit; and a group of switches that are configured to turn on/off the inflow of the electric current to the first processing circuit and the second processing circuit. The control unit is directly connected to the power supply connection unit, and is activated in a case where the power supply connection unit is connected to the external power supply. The control unit is configured to cause the device to operate in the charging mode for predetermined time after being activated, and then switch operation of the device to the operating mode. In the charging mode, the group of switches are turned off to stop the inflow of the electric current to the first processing circuit and the second processing circuit, and the limit value of the current limiting circuit is set to a high value (H). As a result, electric charge is stored quickly in the power storage unit. In the operating mode, the group of switches are turned on to start the inflow of the electric current to the first processing circuit and the second processing circuit, and the limit value of the current limiting circuit is set to a low value (L). As a result, the entire operation of the electronic device is started, and even when the power consumption of the first processing circuit varies, the power consumption can be supplemented with the electric charge in the power storage unit during the peak. According to the present invention, sound can be emitted at a large volume, and the device can be started quickly even with small power supply, for example.

In the above-mentioned invention, the external power supply may have a suppliable current limited to a predetermined maximum value, and the first processing circuit may have a large variation in current consumption during operation as compared to the control unit and the second processing circuit. Further, the high value of the limit value of the current limiting circuit (second value) may be set to "the predetermined maximum value−current consumption of the control unit" (a value obtained by subtracting current consumption of the control unit from the predetermined maximum value), and the low value of the limit value (first value) may be set to "the predetermined maximum value−the current consumption of the control unit−current consumption of the second processing circuit" (a value obtained by subtracting the current consumption of the control unit and current consumption of the second processing circuit from the predetermined maximum value).

In the above-mentioned invention, the external power supply may include bus power supplied from a USB port, and the control unit may start, after the USB connection is made, the charging mode before enumeration, and switch to the operating mode in a case where the enumeration ends.

In the above-mentioned invention, the first processing circuit may include an audio amplifier configured to amplify power of uttered human voice with a large level variation, and may consume the electric current exceeding the current limit value of the low value (first value) in a case where uttered voice exceeding a predetermined level is input. In this case, the shortage may be supplemented with the electric charge stored in the power storage unit.

In the above-mentioned invention, the limit value of the current limiting circuit may be gradually increased to the high value (second value) in a case where the control unit starts the charging mode. As a result, the inrush current can be prevented.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An electronic device, comprising:
   a power supply connection unit that is connected to an external power supply;
   a control unit, a first processing circuit, and a second processing circuit, each of which is configured to operate by receiving an electric current supplied from the power supply connection unit;
   a current limiting circuit that is configured to limit the electric current supplied from the external power supply to the first processing circuit; and
   a power storage unit that is inserted between the current limiting circuit and the first processing circuit to be in parallel to the first processing circuit,
   the first processing circuit being supplemented with an electric charge stored in the power storage unit in a case where a consumed electric current of the current limiting circuit exceeds a current limit value, and
   the control unit being configured to, in response to the connection of the power supply connection unit to the external power supply, limit inflow of the electric current to the first processing circuit and the second processing circuit and start a charging mode in which the current limit value is set to a second value that is higher than a first value, and to then release the limit on the inflow of the electric current to the first processing circuit and the second processing circuit and switch to an operating mode in which the current limit value is set to the first value.

2. The electronic device according to claim 1,
   wherein the external power supply has a suppliable current limited to a predetermined maximum value,
   wherein the first processing circuit has a large variation in current consumption during operation as compared to the control unit and the second processing circuit, and
   wherein the second value is a "value obtained by subtracting current consumption of the control unit from the predetermined maximum value", and the first value is a "value obtained by subtracting the current consumption of the control unit and current consumption of the second processing circuit from the predetermined maximum value".

3. The electronic device according to claim 2,
   wherein the external power supply includes bus power supplied from a USB port, and
   wherein the control unit is configured to start the charging mode before executing an enumeration process in which the control unit transmits descriptive information about the electronic device to an external device, and to switch to the operating mode in a case where the enumeration process ends.

4. The electronic device according to claim 1,
   wherein the first processing circuit includes an audio amplifier configured to amplify a power of an uttered voice, and in a case where an uttered voice exceeding a predetermined level is input, the audio amplifier is configured to consume an electric current that exceeds the first value.

5. The electronic device according to claim 1,
   wherein the control unit is configured to, in a case where the charging mode is started, gradually increase the current limit value to the second value.

6. The electronic device according to claim 1, further comprising a group of switches that are configured to turn on/off the inflow of the electric current to the first processing circuit and the second processing circuit,
   wherein the control unit is configured to, in response to the connection of the power supply connection unit to the external power supply, turn off the group of switches to limit the inflow of the electric current to the first processing circuit and the second processing circuit and start the charging mode in which the current limit value is set to the second value, and to then turn on the group of switches to release the limit on the inflow of the electric current to the first processing circuit and the second processing circuit and switch to the operating mode in which the current limit value is set to the first value.

7. The electronic device according to claim 1,
   wherein the power storage unit includes an electric double layer capacitor.

8. The electronic device according to claim 1,
   wherein the first processing circuit has a large variation in current consumption during operation as compared to the second processing circuit, and
   wherein the current limiting circuit and the power storage unit are provided for the first processing circuit, but are not provided for the second processing circuit.

9. The electronic device according to claim 1,
   wherein the electronic device is an audio conference device.

10. The electronic device according to claim 1,
    wherein the electronic device is a speaker.

11. A control method for an electronic device including a first processing circuit and a second processing circuit that each operate by an electric current supplied from an external power supply, the control method comprising:
    charging a power storage unit that is inserted between a current limiting circuit and the first processing circuit to be in parallel to the first processing circuit, the current limiting circuit being configured to limit the electric current supplied from the external power supply to the first processing circuit;
    supplementing the first processing circuit with an electric charge stored in the power storage unit in a case where a consumed electric current of the current limiting circuit exceeds a current limit value;

limiting, in response to the connection to the external power supply, inflow of the electric current to the first processing circuit and the second processing circuit, and starting a charging mode in which the current limit value is set to a second value that is higher than a first value; and releasing the limit on the inflow of the electric current to the first processing circuit and the second processing circuit and, switching to an operating mode in which the current limit value is set to the first value.

12. The control method according to claim 11, wherein the external power supply has a suppliable current limited to a predetermined maximum value, wherein the first processing circuit has a large variation in current consumption during operation as compared to the control unit and the second processing circuit, and wherein the second value is a value obtained by subtracting current consumption of the control unit from the predetermined maximum value, and the first value is a value obtained by subtracting the current consumption of the control unit and current consumption of the second processing circuit from the predetermined maximum value.

13. The control method according to claim 12, wherein the external power supply includes bus power supplied from a USB port, and wherein the charging mode is started before executing an enumeration process in which the control unit transmits descriptive information about the electronic device to an external device, and it is switched to the operating mode in a case where the enumeration process ends.

14. The control method according to claim 11, wherein the first processing circuit includes an audio amplifier configured to amplify a power of an uttered voice, and in a case where an uttered voice exceeding a predetermined level is input, the audio amplifier is configured to consume an electric current that exceeds the first value.

15. The control method according to claim 11, wherein the current limit value is gradually increased to the second value in a case where the charging mode is started.

16. The control method according to claim 11, wherein the electronic device further includes a group of switches that are configured to turn on/off the inflow of the electric current to the first processing circuit and the second processing circuit, wherein in response to the connection of the power supply connection unit to the external power supply, the group of switches are turned off to limit the inflow of the electric current to the first processing circuit and the second processing circuit and the charging mode is started, and then the group of switches are turned on to release the limit on the inflow of the electric current to the first processing circuit and the second processing circuit and it is switched to the operating mode.

17. The control method according to claim 11, wherein the power storage unit includes an electric double layer capacitor.

18. The control method according to claim 11, wherein the first processing circuit has a large variation in current consumption during operation as compared to the second processing circuit, and wherein the current limiting circuit and the power storage unit are provided for the first processing circuit, but are not provided for the second processing circuit.

19. The control method according to claim 11, wherein the electronic device is an audio conference device.

20. The control method according to claim 11, wherein the electronic device is a speaker.

* * * * *